(12) United States Patent
Ichinohe

(10) Patent No.: US 9,024,052 B2
(45) Date of Patent: May 5, 2015

(54) DUAL END GLYCEROL (METH) ACRYLATE-MODIFIED SILICONE AND MAKING METHOD

(75) Inventor: Shoji Ichinohe, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 399 days.

(21) Appl. No.: 13/528,904

(22) Filed: Jun. 21, 2012

(65) Prior Publication Data

US 2012/0330046 A1 Dec. 27, 2012

(30) Foreign Application Priority Data

Jun. 22, 2011 (JP) ................................ 2011-138064

(51) Int. Cl.
*C07F 7/08* (2006.01)
*C08G 77/20* (2006.01)
*C08G 77/04* (2006.01)

(52) U.S. Cl.
CPC .............. *C08G 77/20* (2013.01); *C08G 77/045* (2013.01)

(58) Field of Classification Search
CPC .................................................... C08G 77/045
USPC ......................................................... 556/440
See application file for complete search history.

(56) References Cited

U.S. PATENT DOCUMENTS

| 5,260,000 | A | 11/1993 | Nandu et al. |
| 2008/0004383 | A1 | 1/2008 | Nakamura et al. |
| 2011/0046332 | A1 | 2/2011 | Breiner et al. |

FOREIGN PATENT DOCUMENTS

| JP | 8-501504 A | 2/1996 |
| JP | 2009-542674 A | 12/2009 |
| WO | WO 94/03324 A1 | 2/1994 |
| WO | WO 2008/147374 A2 | 12/2008 |
| WO | WO 2009/149985 A1 | 12/2009 |
| WO | WO 2010039653 A1 * | 4/2010 |

OTHER PUBLICATIONS

Wang W., European Polymer Journal 39 (2003) 1117-1123.*
Extended European Search Report issued Nov. 15, 2012, in European Patent Application No. 12171217.8.

* cited by examiner

*Primary Examiner* — Porfirio Nazario Gonzalez
*Assistant Examiner* — Kofi Adzamli
(74) *Attorney, Agent, or Firm* — Birch, Stewart, Kolasch & Birch, LLP

(57) ABSTRACT

A dual end glycerol (meth)acrylate-modified silicone having formula (I): $R^1Me_2SiO(R^2{}_2SiO)_aSiMe_2R^1$ is novel. $R^1$ is a mixture of 70-95 mol % of a group having formula (i) and 30-5 mol % of a group having formula (ii) wherein $R^3$ is H or methyl, $R^2$ is a monovalent hydrocarbon group which may be halogenated, Me stands for methyl, and a is an integer of 10-300.

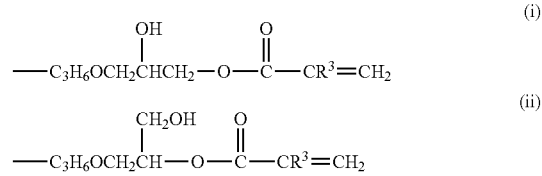

4 Claims, 3 Drawing Sheets

US 9,024,052 B2

DUAL END GLYCEROL (METH)ACRYLATE-MODIFIED SILICONE AND MAKING METHOD

CROSS-REFERENCE TO RELATED APPLICATION

This non-provisional application claims priority under 35 U.S.C. §119(a) on Patent Application No. 2011-138064 filed in Japan on Jun. 22, 2011, the entire contents of which are hereby incorporated by reference.

TECHNICAL FIELD

This invention relates to novel dual end glycerol (meth)acrylate-modified silicones which may be copolymerized with other hydrophilic monomers to form copolymers suitable as ophthalmic lenses including contact lenses (e.g., hydrophilic contact lenses and silicone hydrogels), intraocular implants, and artificial cornea, and a method for preparing the same.

BACKGROUND ART

Polysiloxanes terminated with a polymerizable group (e.g., methacrylate, acrylate or vinylcarbonate group) are known from Patent Document 1 (JP-A H08-501504), for example. Patent Document 1 also describes that the polysiloxanes are copolymerized with hydrophilic monomers to form hydrophilic silicone contact lenses or silicone hydrogels. Although polysiloxanes terminated with a urethane bond are fully compatible with hydrophilic monomers such as N-vinylpyrrolidone, those polysiloxanes terminated solely with a polymerizable group are less compatible with hydrophilic monomers and unsuitable as the starting material for silicone hydrogels.

Patent Document 2 (JP-A 2009-542674) discloses a single end glycerol (meth)acrylate-modified silicone resulting from platinum-catalyzed addition reaction of a silicone pentamer having a SiH group at one end with allyl glycerol (meth)acrylate. However, Patent Document 2 refers to neither dual end glycerol (meth)acrylate-modified silicones nor the removal of excess allyl compounds used in the preparation of modified silicones.

CITATION LIST

Patent Document 1: JP-A H08-501504 (WO 94/03324, U.S. Pat. No. 5,260,000)
Patent Document 2: JP-A 2009-542674 (WO 2008/147374, US 20080004383)

DISCLOSURE OF INVENTION

An object of the invention is to provide a dual end glycerol (meth)acrylate-modified silicone of higher molecular weight and high purity which is highly compatible with hydrophilic monomers, and a method for preparing the same.

To attain the above and other objects and to solve the compatibility problem of prior art (meth)acrylate-terminated silicones used as the intraocular implant material, the inventor made efforts to develop a glycerol (meth)acrylate-modified silicone of high purity having a hydroxyl group introduced at both ends of the polysiloxane, and to develop a glycerol (meth)acrylate-modified silicone of high purity in which all siloxane terminal groups can participate in copolymerization with other polymerizable monomers and which forms a copolymer with a minimal variability of lens physical properties.

It is noted that common dual end (meth)acrylate-modified silicones are free of a hydroxyl group because the siloxane terminal silicon atom and the (meth)acryloxy group are linked by an alkyl group, typically propyl or butyl.

The inventor has found that a dual end glycerol (meth)acrylate-modified silicone of high purity can be obtained by starting with a dual end hydrogenpolysiloxane, reacting its SiH group with an excess amount of allyl glycerol (meth)acrylate, and washing the reaction mixture with a water-soluble solvent such as methanol or acetone to remove the excess of allyl glycerol (meth)acrylate.

It is noted that the single end modified silicone of Patent Document 2 is a compound consisting of at most 8 Si monomer units whereas the modified silicone of the invention is a silicone consisting of at least 12 monomer units and having functionality at both ends rather than one end.

In one aspect, the invention provides a dual end glycerol (meth)acrylate-modified silicone having the general formula (I):

$$R^1Me_2SiO(R^2{}_2SiO)_aSiMe_2R^1 \quad (I)$$

wherein $R^1$ is a mixture of 70 to 95 mol % of a group having formula (i) and 30 to 5 mol % of a group having formula (ii):

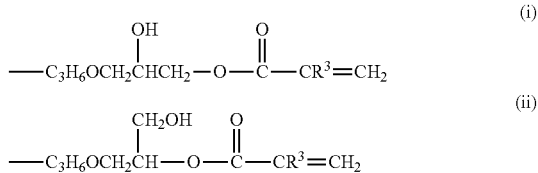

$$\text{---}C_3H_6OCH_2\underset{\underset{OH}{|}}{C}HCH_2\text{---}O\text{---}\underset{\underset{O}{\|}}{C}\text{---}CR^3{=}CH_2 \quad (i)$$

$$\text{---}C_3H_6OCH_2\underset{\underset{CH_2OH}{|}}{C}H\text{---}O\text{---}\underset{\underset{O}{\|}}{C}\text{---}CR^3{=}CH_2 \quad (ii)$$

wherein $R^3$ is hydrogen or methyl, $R^2$ is each independently a monovalent hydrocarbon group of 1 to 10 carbon atoms which may be halogenated, Me stands for methyl, and $a$ is an integer of 10 to 300.

Specifically, the invention provides a dual end glycerol (meth)acrylate-modified silicone having the general formula (II):

$$RMe_2SiO(R^2{}_2SiO)_aSiMe_2R \quad (II)$$

wherein R is hydrogen or an organic group, at least 95 mol % of R being $R^1$ as defined above, $R^2$ and $a$ are as defined above.

In another aspect, the invention provides a method for preparing a dual end glycerol (meth)acrylate-modified silicone having the general formula (I), comprising the steps of addition reaction using a dual end hydrogen silicone having the general formula (III) and allyl compounds having the general formulae (IV) and (V), and optionally washing the reaction mixture with a water-soluble organic solvent to remove the excess of allyl compounds. In the addition reaction step, a ratio of the allyl compound of formula (IV) to the allyl compound of formula (V) is 70-95 mol % to 30-5 mol %, and a total allyl group amount available from the allyl compounds of formulae (IV) and (V) is in molar excess of an SiH group amount available from the hydrogen silicone of formula (III).

$$HMe_2SiO(R^2{}_2SiO)_aSiMe_2H \quad (III)$$

Herein $R^2$ is each independently a monovalent hydrocarbon group of 1 to 10 carbon atoms which may be halogenated, Me stands for methyl, and $a$ is an integer of 10 to 300.

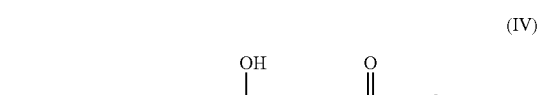

(IV)

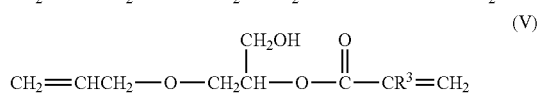

(V)

Herein $R^3$ is hydrogen or methyl.

(I)

Herein $R^1$, $R^2$, Me, and a are as defined above.

Advantageous Effects of Invention

A dual end glycerol (meth)acrylate-modified silicone of high purity and higher molecular weight can be obtained. The modified silicone containing a mixture of 70 to 95 mol % of group (i) and 30 to 5 mol % of group (ii) has the advantage of improved compatibility with hydrophilic monomers by virtue of the primary hydroxyl moiety in group (ii).

DESCRIPTION OF EMBODIMENTS

Figure 1:
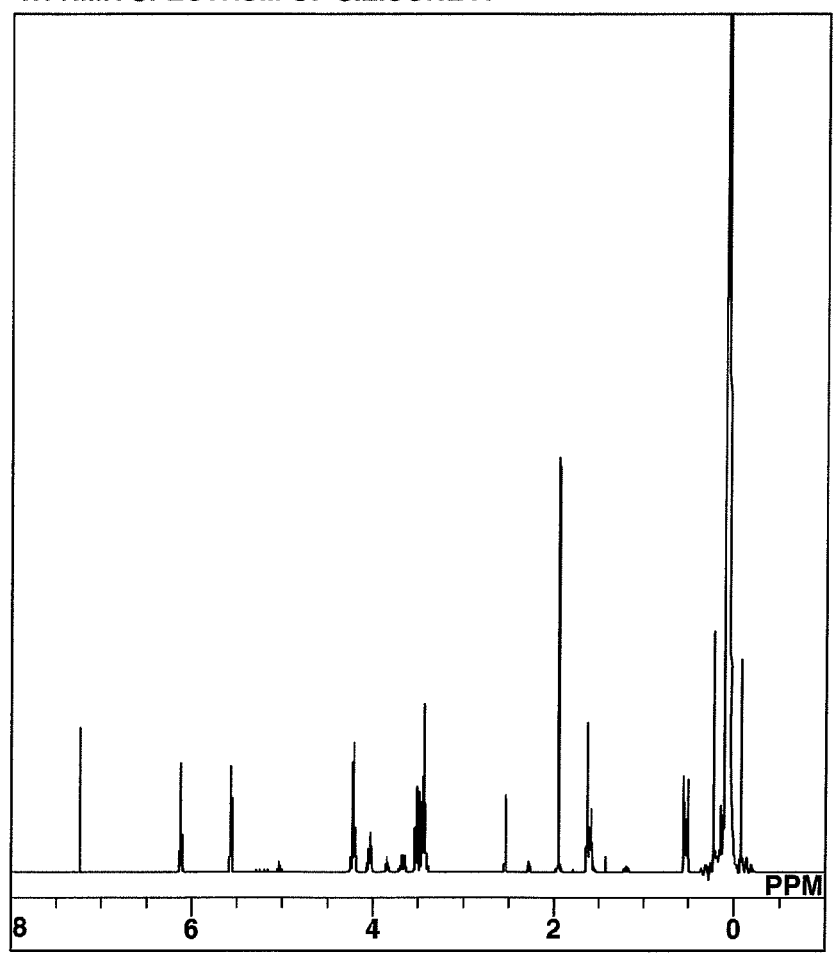
FIG. 1 is a diagram showing $^1$H-NMR spectrum of silicone A.

One embodiment of the invention is a dual end glycerol (meth)acrylate-modified silicone having the general formula (I) which finds use as ophthalmic lenses.

(I)

Herein $R^1$ is a mixture of 70 to 95 mol % of a group having formula (i) and 30 to 5 mol % of a group having formula (ii). Preferably a ratio of the group having formula (i) to the group having formula (ii) is 75 to 90 mol % to 25 to 10 mol %, provided that the sum of these groups is 100 mol %.

Herein $R^3$ is hydrogen or methyl. $R^2$ is each independently a monovalent hydrocarbon group of 1 to 10 carbon atoms, preferably 1 to 6 carbon atoms, typically alkyl or aryl, or a halogenated form of the monovalent hydrocarbon group in which at least one hydrogen is substituted by a halogen atom such as fluorine, chlorine or bromine. Me stands for methyl, and "a" is an integer of 10 to 300, preferably 20 to 150.

The modified silicone contains only two (meth)acrylate groups at both ends of the molecule, and is fully compatible with other polymerizable monomers. Because of high reactivity, few (meth)acrylate groups remain unreacted in a polymer resulting from copolymerization of the modified silicone. Thus the polymer has stable physical properties.

In another embodiment, the dual end glycerol (meth)acrylate-modified silicone having formula (I) is prepared via addition reaction using a dual end hydrogen silicone having the general formula (III) and allyl compounds having the general formulae (IV) and (V). A ratio of the allyl compound of formula (IV) to the allyl compound of formula (V) is 70-95 mol % to 30-5 mol %. A total amount of allyl groups available from the allyl compounds of formulae (IV) and (V) is in molar excess of an amount of SiH groups available from the dual end hydrogen silicone of formula (III).

$$HMe_2SiO(R^2_2SiO)_aSiMe_2H \quad (III)$$

Herein $R^2$, Me, and a are as defined above.

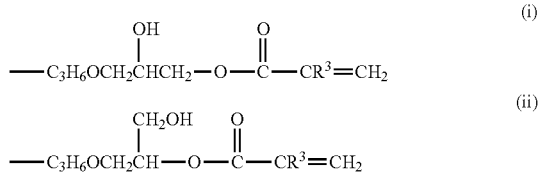

Herein $R^3$ is hydrogen or methyl.

After the addition reaction, the reaction mixture is preferably washed with a water-soluble organic solvent such as methanol or acetone to remove the excess of allyl compounds.

The addition reaction may be performed in the presence of an addition reaction catalyst, typically a well-known platinum group metal based catalyst. The platinum group metal based catalyst is preferably used in such amounts to give 0.1 to 100 ppm, more preferably 1 to 10 ppm of platinum group metal based on the weight of the dual end hydrogen silicone having formula (III).

The reaction temperature is preferably in a range of 0 to 150° C., more preferably 30 to 90° C. At higher temperatures, SiH group is fast consumed. However, the resulting siloxane may lose radical reactivity at its end because not only the addition reaction of allyl group of allyl compounds and SiH group takes place, but the addition reaction of (meth)acrylate group and SiH group can also occur. Additionally, the hydroxyl groups in formulae (IV) and (V) and SiH groups can be dehydrogenated to form impurities.

For the addition reaction, a solvent may or may not be used. Suitable solvents, if used, include alcoholic solvents such as ethanol and isopropanol, ketone solvents such as methyl ethyl ketone and methyl isobutyl ketone, ester solvents such as ethyl acetate and butyl acetate, aromatic hydrocarbons such as toluene and xylene, aliphatic hydrocarbons such as hexane and methylcyclohexane, and ether solvents such as ethylene glycol dimethyl ether and dioxane.

Of these solvents, alcoholic solvents such as ethanol and isopropanol are less preferred because impurities can be produced via dehydrogenation of hydroxyl and SiH groups. For the purpose of reducing such impurities, the allyl compounds (IV) and (V) are used in molar excess relative to the SiH group. Specifically, the allyl compounds (IV) and (V) are used in a total amount of 1.5 to 2.5 moles per mole of the SiH group. A total amount of less than 1.5 moles is undesirable because more impurities form and the desired product is obtained in lower purity. A total amount of more than 2.5 moles of the allyl compounds (IV) and (V) is uneconomical.

Once the solvent is distilled off by heating in vacuum, the residual liquid is combined with a several fold volume of a water-soluble solvent for washing. The combined liquid is allowed to stand whereupon it separates into two layers. The upper layer consists of the water-soluble solvent and the allyl compounds. The lower layer consists of the desired polymer and a fraction of the water-soluble solvent. If desired, a water-soluble solvent is further added to the lower layer so that a minor amount of residual allyl compounds may be removed from the lower layer via two-layer separation. The desired polymer is recovered by distilling off the solvent from the lower layer in vacuum.

Suitable water-soluble solvents include methanol and acetone. The amount of water-soluble solvent used for washing at a time is preferably half to two-fold volume relative to the silicone compound.

The resulting silicone compound has the general formula (II):

$$RMe_2SiO(R^2{}_2SiO)_aSiMe_2R \qquad (II)$$

wherein R is hydrogen or an organic group, at least 95 mol %, preferably at least 97 mol % of R is $R^1$ as defined above, $R^2$ and a are as defined above. The resulting silicone compound is a dual end glycerol (meth)acrylate-modified silicone of formula (I) having a high purity of at least 95%, preferably at least 97%. The balance consists of impurities as mentioned above.

EXAMPLE

Examples are given below by way of illustration and not by way of limitation. Me stands for methyl.

Example 1

Compounds (III-A), (IV-A), and (V-A) of the following formulae were used.

(III-A)

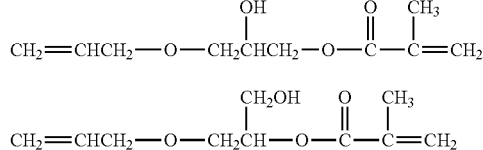
(IV-A)

(V-A)

Compounds (IV-A) and (V-A) were used in a molar ratio of 86.5:13.5.

A 2-L flask equipped with a Dimroth condenser and thermometer was charged with 353.8 g (0.1 mol) of dual end hydrogen silicone of formula (III-A), 80.0 g (0.4 mol) of allyl compounds having formulae (IV-A) and (V-A), 530 g of ethylene glycol dimethyl ether as solvent, 1.0 g of a 0.5 wt % toluene solution of 1,3-divinyl-1,1,3,3-tetramethyldisiloxane complex of neutralized chloroplatinic acid, and 0.9 g of bis-t-butylhydroxytoluene as polymerization inhibitor. Reaction was allowed to run at 50 to 60° C. for 6 hours. At the end of reaction, SiH groups had been fully consumed.

Next, the solvent, ethylene glycol dimethyl ether was distilled off by heating in vacuum. The stripping residue was combined with 430 g of methanol, which was stirred for 10 minutes at room temperature. This was allowed to stand for 30 minutes, after which the lower layer was taken out, with the upper layer discarded. The lower layer was combined with 430 g of methanol, which was stirred for 10 minutes and allowed to stand for 30 minutes. By vacuum stripping of the lower layer, silicone A was recovered as colorless clear fluid.

Figure 2:
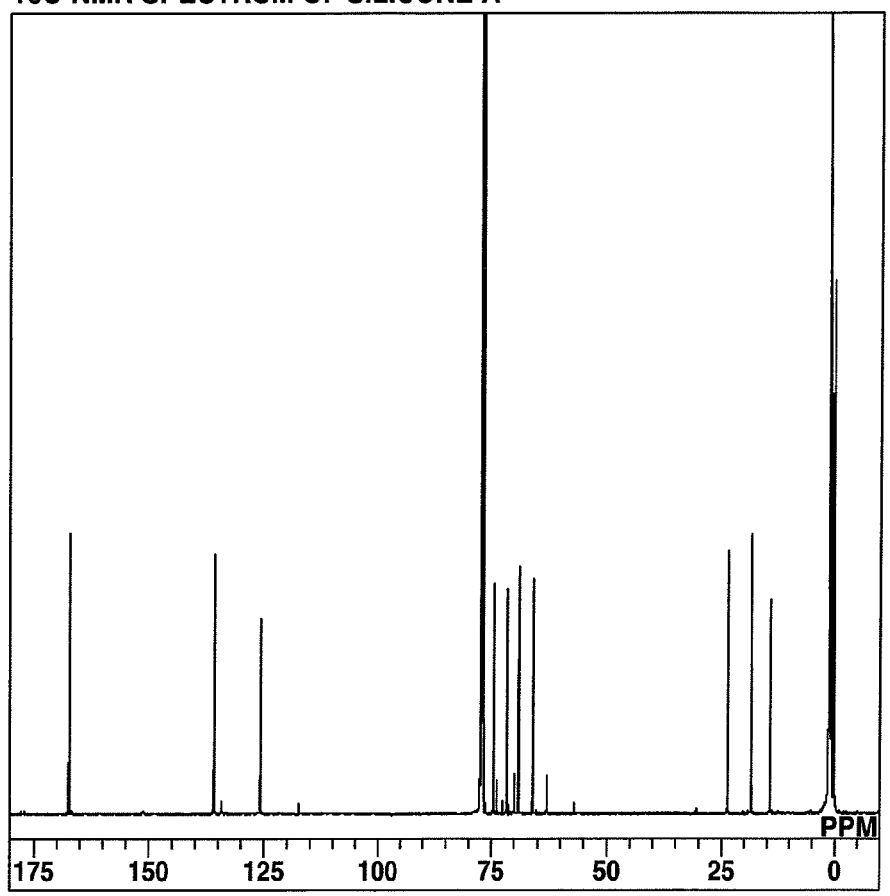
FIG. 2 is a diagram showing $^{13}$C-NMR spectrum of silicone A.
Figure 3:
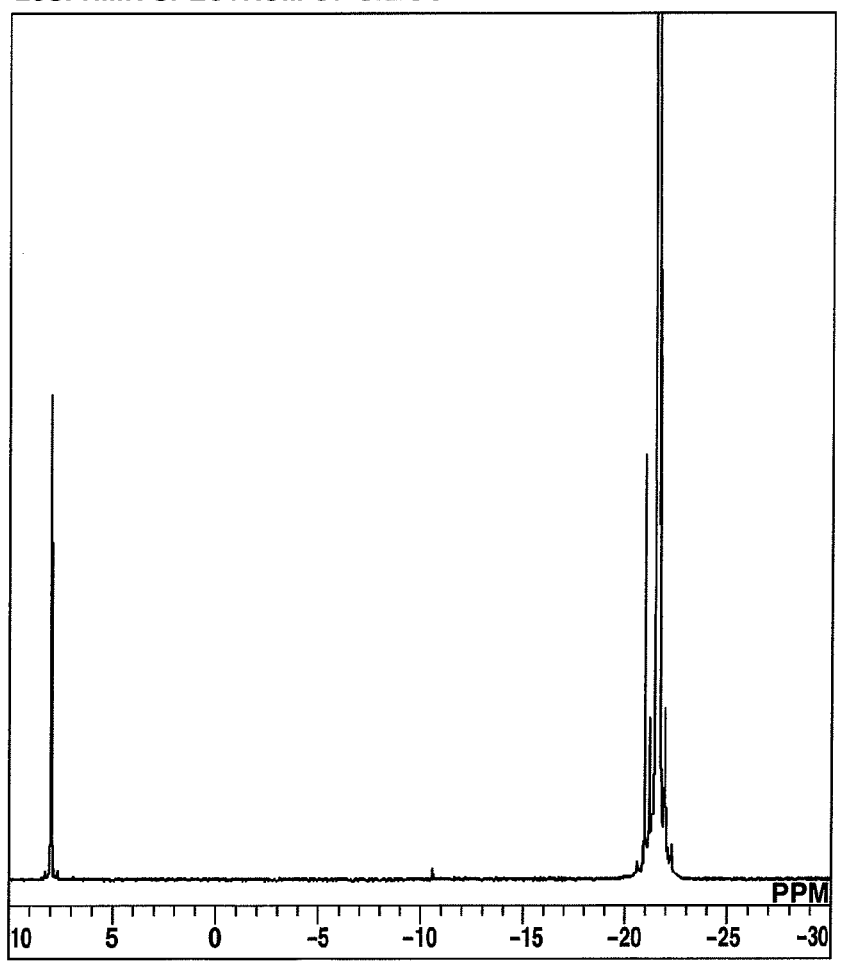
FIG. 3 is a diagram showing $^{29}$Si-NMR spectrum of silicone A.

Physical properties of silicone A
Viscosity (25° C.): 120.6 mm²/s
Refractive index (25° C.): 1.4105
FIGS. 1, 2 and 3 are diagrams showing $^1$H-NMR, $^{13}$C-NMR and $^{29}$Si-NMR spectra of silicone A, respectively. From these data, silicone A was identified to have the following structure.

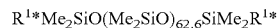

$R^{1*}$ is a mixture of groups having formulae (iii) and (iv):

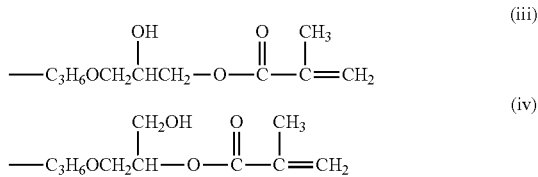

in a molar ratio corresponding to the molar ratio (86.5:13.5) of the starting compounds.

It was found by $^{29}$Si-NMR that silicone terminus $SiMe_2OR^4$ accounted for 2.5 wt % of silicone terminus $SiMe_2R^{1*}$. No addition reaction product of methacrylate group and SiH group was detected by the NMR spectroscopy. From these data, the dual end-modified silicone A was found to have a purity of more than 95%.

It is noted that $R^4$ is a mixture of

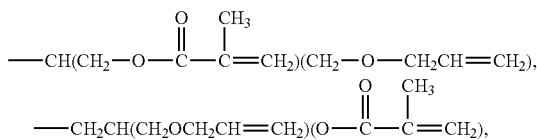

and H.

Japanese Patent Application No. 2011-138064 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A dual end glycerol (meth)acrylate-modified silicone having the general formula (I):

$$R^1Me_2SiO(R^2{}_2SiO)_aSiMe_2R^1 \qquad (I)$$

wherein $R^1$ is a mixture of 70 to 95 mol % of a group having formula (i) and 30 to 5 mol % of a group having formula (ii):

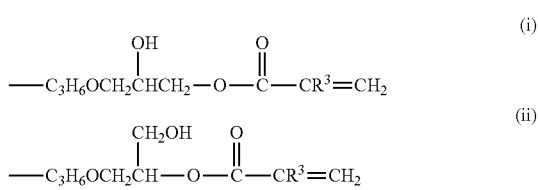

wherein $R^3$ is hydrogen or methyl, $R^2$ is each independently a monovalent hydrocarbon group of 1 to 10 carbon atoms which may be halogenated, Me stands for methyl, and a is an integer of 10 to 300.

2. A dual end glycerol (meth)acrylate-modified silicone having the general formula (II):

$$RMe_2SiO(R^2_2SiO)_aSiMe_2R \qquad (II)$$

wherein R is hydrogen or an organic group, at least 95 mol % of R being $R^1$ as defined in claim 1, $R^2$ and a are as defined in claim 1.

3. A method for preparing a dual end glycerol (meth)acrylate-modified silicone having the general formula (I), comprising the step of addition reaction using a dual end hydrogen silicone having the general formula (III) and allyl compounds having the general formulae (IV) and (V), a ratio of the allyl compound of formula (IV) to the allyl compound of formula (V) being 70-95 mol % to 30-5 mol %, a total allyl group amount available from the allyl compounds of formulae (IV) and (V) being in molar excess of an SiH group amount available from the hydrogen silicone of formula (III), $$HMe_2SiO(R^2_2SiO)_aSiMe_2H \qquad (III)$$

wherein $R^2$ is each independently a monovalent hydrocarbon group of 1 to 10 carbon atoms which may be halogenated, Me stands for methyl, and a is an integer of 10 to 300,

(IV)

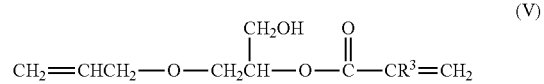

(V)

wherein $R^3$ is hydrogen or methyl, $$R^1Me_2SiO(R^2_2SiO)_aSiMe_2R^1 \qquad (I)$$

wherein $R^1$ is a mixture of 70 to 95 mol % of a group having formula (i) and 30 to 5 mol % of a group having formula (ii):

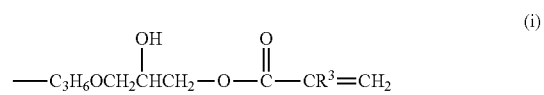

(i)

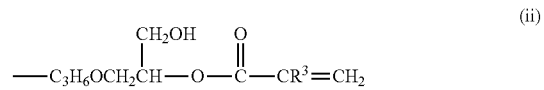

(ii)

wherein $R^3$ is hydrogen or methyl, $R^2$, Me, and a are as defined above.

4. The method of claim 3, further comprising the step of washing the reaction mixture with a water-soluble organic solvent to remove the excess of allyl compounds.

\* \* \* \* \*